(12) United States Patent
Clements et al.

(10) Patent No.: US 9,481,151 B2
(45) Date of Patent: Nov. 1, 2016

(54) METHOD OF PRODUCING AN ELECTROSTATIC FIELD GENERATOR

(71) Applicants: Michael Paul Clements, Orange, CA (US); Craig Miller, San Clemente, CA (US)

(72) Inventors: Michael Paul Clements, Orange, CA (US); Craig Miller, San Clemente, CA (US)

(*) Notice: Subject to any disclaimer, the term of this patent is extended or adjusted under 35 U.S.C. 154(b) by 202 days.

(21) Appl. No.: 14/306,897

(22) Filed: Jun. 17, 2014

(65) Prior Publication Data

US 2015/0360977 A1    Dec. 17, 2015

(51) Int. Cl.
| | |
|---|---|
| B29C 65/52 | (2006.01) |
| B32B 27/30 | (2006.01) |
| B03C 5/02 | (2006.01) |
| B32B 27/08 | (2006.01) |
| B32B 7/12 | (2006.01) |
| B29C 65/48 | (2006.01) |
| B29C 65/00 | (2006.01) |
| C02F 1/46 | (2006.01) |
| C02F 103/02 | (2006.01) |
| B29L 31/18 | (2006.01) |

(52) U.S. Cl.
CPC ........... *B32B 27/304* (2013.01); *B03C 5/02* (2013.01); *B29C 65/483* (2013.01); *B29C 66/0224* (2013.01); *B29C 66/1122* (2013.01); *B29C 66/322* (2013.01); *B29C 66/433* (2013.01); *B29C 66/71* (2013.01); *B32B 7/12* (2013.01); *B32B 27/08* (2013.01); *C02F 1/4602* (2013.01); *B29C 65/4835* (2013.01); *B29C 65/52* (2013.01); *B29K 2995/0005* (2013.01); *B29L 2031/18* (2013.01); *B32B 2327/06* (2013.01); *B32B 2457/00* (2013.01); *C02F 2103/023* (2013.01); *C02F 2303/22* (2013.01)

(58) Field of Classification Search
USPC .......................................... 156/60, 257, 290
See application file for complete search history.

(56) References Cited

U.S. PATENT DOCUMENTS 3,924,228 A * 12/1975 Goodrich .............. G09F 9/372
345/48

FOREIGN PATENT DOCUMENTS

EP          0713354 A2 *  5/1996

* cited by examiner

*Primary Examiner* — Jeff Aftergut

(57) ABSTRACT

The present invention relates generally to a method of producing an electrostatic field generating plate. More specifically, the method enables an electrostatic field generating plate to be produced made from PVC for a water purification system wherein the plate generates an electric field.

5 Claims, 4 Drawing Sheets

METHOD OF PRODUCING AN ELECTROSTATIC FIELD GENERATOR

TECHNICAL FIELD

The present invention relates generally to a method of producing an electrostatic field generating plate. More specifically, the method enables a plate to be produced for a water purification system wherein the electrostatic field generating plate generates an electric field. Such electrostatic field is then used by an electrostatic water purification process for mass cooling systems to reduce scaling.

BACKGROUND

Typically, large cooling systems are needed for high volume air conditioning products, large refrigeration products, and any product that requires the dissipation of large amounts of waste heat. Such large cooling systems like cooling towers and large heat exchangers cool by way of exchanging the heat. The most common known method of exchanging the heat is performed by the use of water in a heat exchanger where cooling water is passed along side pipes that contain hot water or a water based solution where the heat from the hot water is transferred into the cool water.

Although this is an effective way to transfer the heat, often times the cooling water reaches such a high temperature point that it evaporates which creates steam and needs to be vented out of the system. In this event, additional cooling water needs to be added to the system to keep the system operable.

The known problem with these cooling systems that occurs when using water is an effect called scaling. Scaling occurs when the minerals and other debris within the cooling water attaches to the pipes within the cooling system causing insolation. The insolation increases the heat causing the cooling system to use more energy to cool the cooling water. Over time scaling continually builds and eventually overloads the cooling system causing the system to fail and shut down.

Through the years that have been many solutions invented to reduce or control the scaling but often they require the use of harsh chemicals that include strong acids like hydrochloric acid. These strong acids damage the pipes within the cooling system as they prevent and clean off scaling. Additionally, the harsh chemicals often spill or even worse they are vented into the sewer system causing an environmental hazard.

An electrostatic water treatment solution for large cooling systems was invented and taught in U.S. Pat. No. 4,073,713 by Eldon Means "Means etal." This electrostatic water system teaches the use of an electric field as a method for controlling the minerals such within the water such that they do not cause scaling. Unfortunately, the system was difficult and costly to manufacture due to the precise welding needed to produce a device that would generate an electric field while submersible in water.

SUMMARY

The deficiencies of the prior art are substantially overcome in consideration of the invention disclosed herein. More specifically, additional innovation and advantages are realized when smartly configuring an electrostatic field generator to charge minerals within cooling water for a large cooling system.

In the present invention disclosed herein, an electrostatic field generator is used to generate an electrostatic field as cooling water flows around the electrostatic field generating plate. More specifically, an electrostatic field generating plate is used to generate an electrostatic field while allowing cooling water to pass over the faces of the electrostatic field generating plate thereby presenting the cooling water to with an electrostatic charge of a predetermined polarity. This thereby charges the minerals within the water to the desired polarity. The desired voltage used to produce the electrostatic field is between +−30 kv and +−60 kv. The electrostatically charged minerals are then carried by way of a pump to a discharge collection area. The discharge collection area presents an opposite polarity charge thereby overcoming the attraction forces between the water and the minerals such that the minerals collect in the discharge collection area while the mineral free cooling water continues to the heat exchanger.

The electrostatic field generating plate of the present invention consists of two polyvinyl chloride (PVC) plates that house a conductive layer which is coupled to a potential power source enabled to provide a potential level of charge such to be sufficient to charge the materials within the cooling water. Additionally, the conductive layer is electrically coupled to a charging source to control the potential level of the charge applied to the conductive layer. Additionally the polyvinyl chloride exterior shell is sealed with a non-conductive high stress bonding adhesive much like non-conductive adhesive resin. The potential level of charges should be sufficient to charge the minerals within the cooling water.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a field generating plate and a method of producing the field generating plate. The particularly innovative aspect of the present invention is realized in the method that produces an electric field generating plate that reduces the complexity and cost of manufacturing a field generating means thereby enabling the broadened use of the electrostatic water treatment solution over the chemical water treatment solutions prevalent today.

Figure 1:
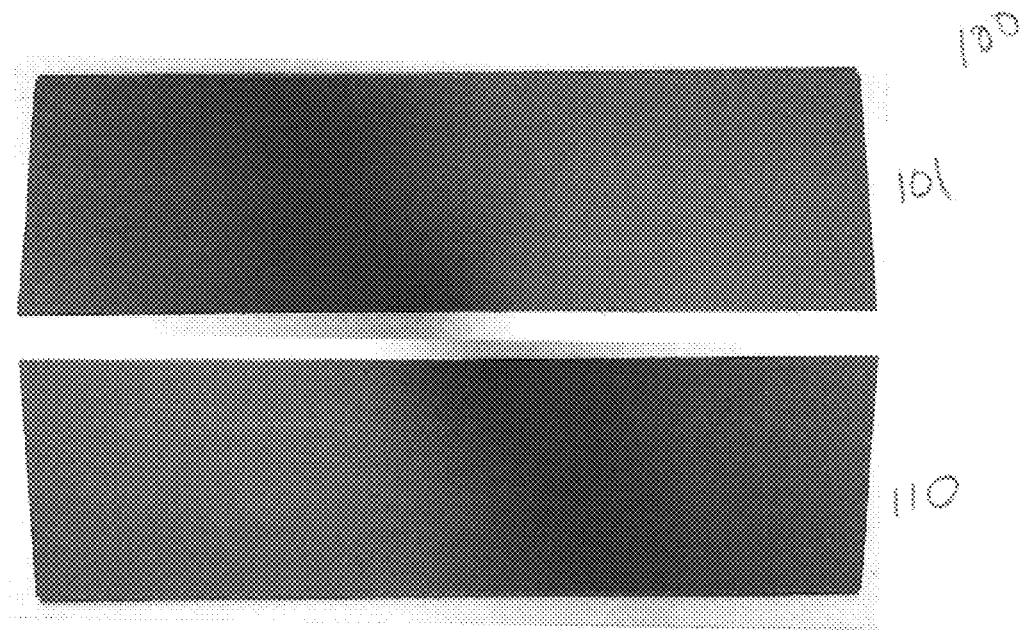
FIG. 1 illustrates the present invention after completing step 1

In the present invention, a method of producing a field generating means is disclosed for an electrostatic water treatment system whereby the field generating means is an electrostatic field generating plate system. The electrostatic field generating plate system may include several small electrostatic field generating plates in one hand or one large electrostatic field generating plate in another and depends on the space available. As represented in FIG. 1 the first step of the method to create an electrostatic field generating plate system is to produce two PVC plates 101 and 110 whereby each PVC plate has a preferred thickness of ¼ of an inch thick where the thickness can range between ⅛$^{th}$ of an inch thick to 2 inches thick.

Figure 2:
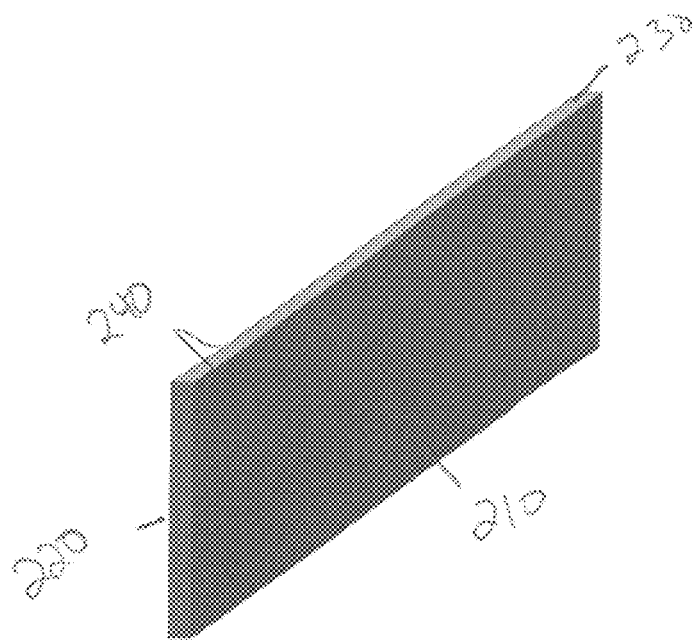
FIG. 2 illustrates a perspective view of the present invention after completing step 1

As represented in (FIG. 2), the plates consist of an interior face 210 and an exterior face 220. The interior face and exterior face are opposed to each other and are separated by the thickness of the plate which creates sides 230 around the perimeter of the interior face 210 and the exterior face 220. These sides 230 reside at ninety degree angles to the interior face 210 and exterior face 220 thereby together creating a rectangular box and an edge 240 along the perimeter of the interior face 210 and the exterior face 220. The PVC enables a cost effective production of the plate system when comparing to metal or more specifically stainless steel which needs to be welded together.

Figure 3:
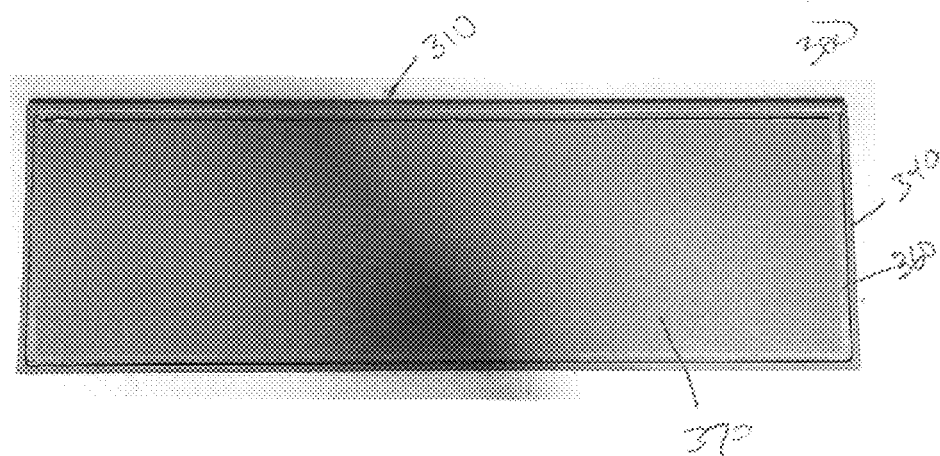
FIG. 3 illustrates the present invention after completing step 2

As represented in FIG. 3, once two plates are produced, the next step in the process is to route a groove 360 near, a quarter of an inch away from, the edge 340 of the interior face 310 of each plate, using a routing tool or routing machine, creating an interior support structure 370 that is separated from the edge 340 of the plate 300, by the groove 360. In the most preferred embodiment of the invention, the groove 360 has a depth of ¼ inch and a width of ½ inch. The width of the groove 360 can be increased in size by as much as fifty percent but doing so would require more epoxy and become less effective. The depth of the grove 360 may also be increased but to ensure the plate's structural integrity at no time should the depth of the groove 360 be more than fifty percent of the overall thickness of the plate 300. The purpose of the groove is to hold resin that will bind the two plates together. It is conceivable to combine the steps of providing a PVC plate and routing a groove by manufacturing processes for producing PVC products such as using an injection molding process and machine.

Figure 4:
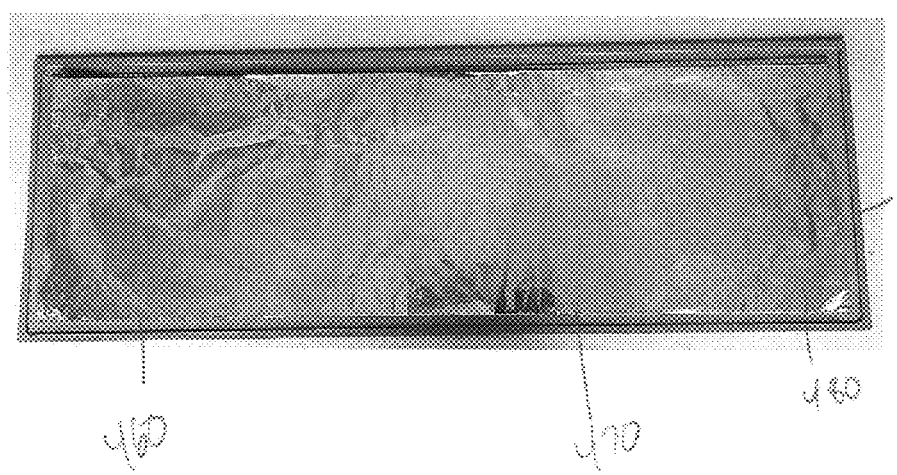
FIG. 4 illustrates the present invention after completing step 3

The next step in the method is represented in FIG. 4 and includes mounting a conductive layer 480 on the interior support structure 470 of one plate while leaving the second plate free of such conductive layer 480. In the most preferred embodiment of the present invention the conductive layer 470 is made up of a single piece of aluminum sheet whereby the thickness of the aluminum sheet is at least 5 mils thick with the preferred thickness of 8 mils and the maximum thickness being 500 mils. Additionally, in practice the conductive layer 480 completely covers the support structure 470 and extends into a portion of the groove 460. The purpose for the conductive layer 480 extending into the portion of the groove 460 is so that when a non-conductive adhesive resin (not shown) is placed into the groove 460, the non-conductive adhesive resin adheres the conductive layer 480 adjacent to the support structure 470, such the conductive layer 480 stays in place during transportation and use.

Figure 5:
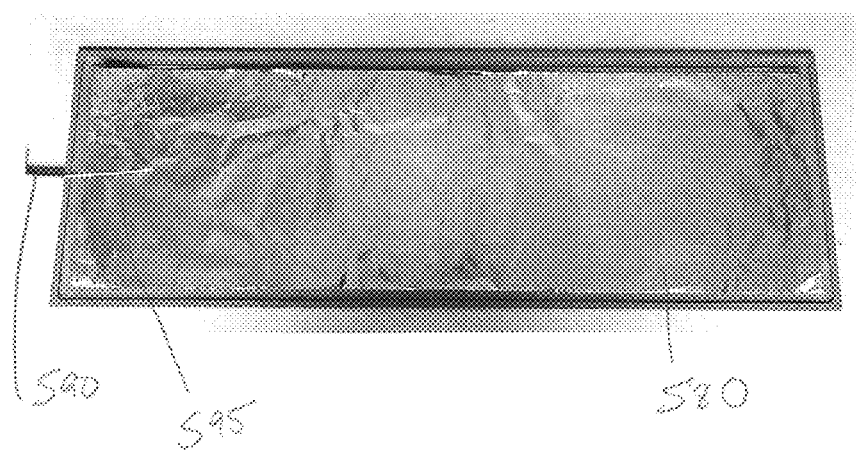
FIG. 5 illustrates the present invention after completing step 4

The next step in the method as represented in FIG. 5 electrically connects the conductive layer 580 to a charging source (not represented) through an electrical connection means 590. Electrically connecting the electrical connection means 590 to the conductive layer 580 can be accomplished by connectors (not shown) attached to a wire 595 which is affixed to the conductive layer 580 by attaching the wire 595 to the conductive layer which is held in place with the non-conductive adhesive resin.

Figure 6:
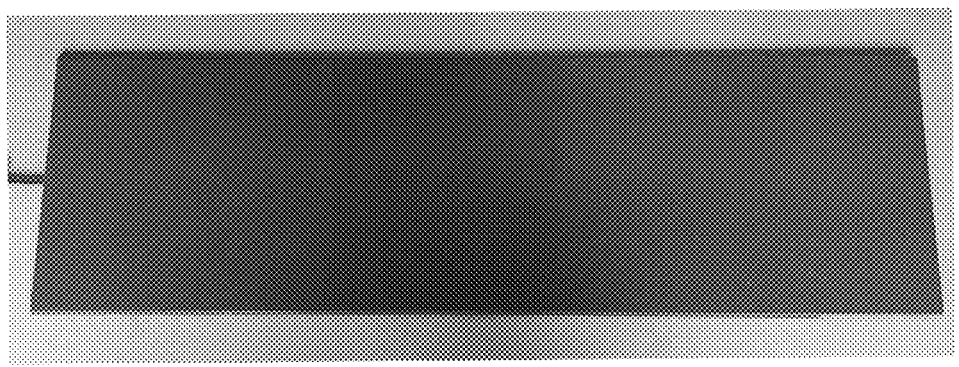
FIG. 6 illustrates the present invention after completing step 5

The next and near final step in the method includes filling the groove with a non-conductive adhesive resin (not shown) wherein the non-conductive adhesive resin is used to bind the first plate to the second pate creating a water tight seal around the electrical connection means wherein the first plate is fixed to the second plate and wherein the conductive layer is held within (FIG. 6).

The final step in the method is to place the one plate and the second plate together such that they nearly contact each other and whereby the resin contacts and permeates throughout the groove of both the interior face of one plate and the interior face of another plate to provide a barrier such that the interior faces of the one plate does not contact the interior face of the second plate and such that a water tight seal is created. Additionally, once the non-conductive adhesive resin has cured any excess can be cleaned off to provide a smooth surface around the sides of the adjoined plates as shown in FIG. 6.

Figure 7:
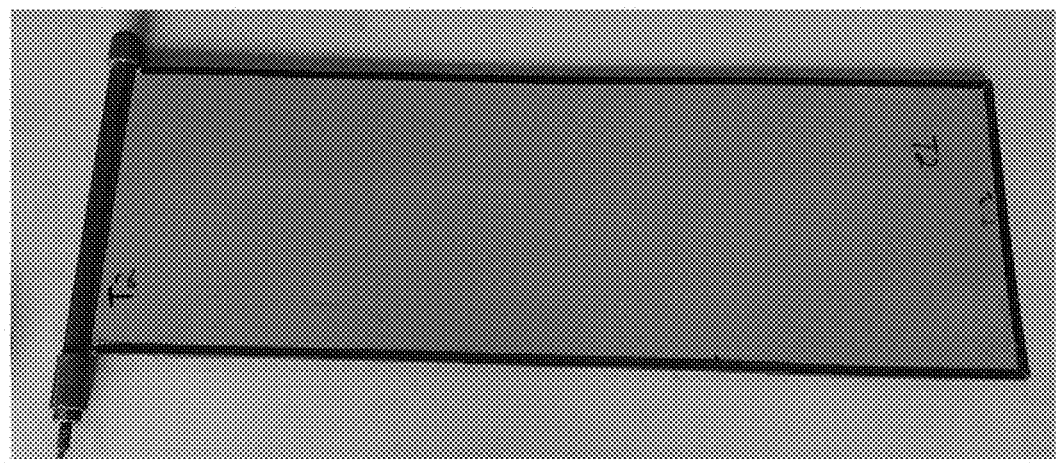
FIG. 7 illustrates a flow chart of the steps performed in the method

A flowchart is provided in FIG. 7 representing the steps of the method for producing an electrostatic field generating plate of the present invention. The steps include step 1, 710 where two PVC plates are provided. The next step, step 2 720, includes routing a grove around each of the two plates. Step 3 730 is the next step, and includes mounting a conductive layer to the inner structure of one of the plates and step 4 740 includes electrically connecting the conductive layer with a wire. Step 5 750, includes applying a non-conductive resin into the groove of the plate that includes the conductive layer and the final step, step 6 760, includes pressing the plates together such that the non-conductive resin fills both grooves of the two plates.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modification that are suited to the particular use contemplated. It is intended that the scope of the invention be defined by the claims and their equivalents.

What is claimed is:

1. A method of producing a field generating means for water cooling system, consisting of
   providing at least two polyvinyl chloride plates;
   routing a groove near the edge of the polyvinyl chloride plate creating an interior support structure;
   mounting a conductive means covering the interior support structure; filling the groove with a non-conductive adhesive resin; and
   binding interior faces of the at least two polyvinyl chloride together,
   wherein the non-conductive adhesive resin provides a water tight seal while binding the polyvinyl chloride plates together.
2. The method of
   claim 1, wherein the conductive means is electrically connected to a potential charging source.

3. The method of claim 2, wherein the potential charging source supplies sufficient power to charge the materials within an electrostatic water treatment solution for a large water cooling system.

4. The method of claim 3, wherein the charging source supplies between +−30 kV to +−60 kV.

5. An electrostatic field generating means for an electrostatic water treatment solution of a cooling system made in accordance with the method of claim 1.

* * * * *